(12) United States Patent
Pinola

(10) Patent No.: US 6,885,640 B2
(45) Date of Patent: Apr. 26, 2005

(54) METHOD FOR MEASURING OPERATION OF CELLULAR RADIO SYSTEM, AND CELLULAR RADIO SYSTEM

(75) Inventor: Timo Pinola, Oulu (FI)

(73) Assignee: Nokia Corporation, Espoo (FI)

( * ) Notice: Subject to any disclaimer, the term of this patent is extended or adjusted under 35 U.S.C. 154(b) by 710 days.

(21) Appl. No.: 09/988,766

(22) Filed: Nov. 20, 2001

(65) Prior Publication Data

US 2002/0032008 A1 Mar. 14, 2002

Related U.S. Application Data

(63) Continuation of application No. PCT/FI00/00498, filed on Jun. 5, 2000.

(30) Foreign Application Priority Data

Jun. 4, 1999 (FI) .................................................. 991286

(51) Int. Cl.[7] .......................... H04L 12/26; H04Q 7/00; H04J 3/00
(52) U.S. Cl. ....................... 370/241; 370/331; 370/336; 455/423
(58) Field of Search ................................ 370/241, 331, 370/328, 336, 347, 352, 355, 356; 455/423, 422.1

(56) References Cited

U.S. PATENT DOCUMENTS

| 5,410,753 | A | | 4/1995 | Szabo |
| 5,425,076 | A | | 6/1995 | Knippelmier |
| 5,970,412 | A | * | 10/1999 | Maxemchuk ............... 455/447 |
| 6,052,584 | A | * | 4/2000 | Harvey et al. .............. 455/423 |
| 6,791,988 | B1 | * | 9/2004 | Hameleers et al. ......... 370/401 |

FOREIGN PATENT DOCUMENTS

| EP | 767 552 | 4/1997 |
| EP | 845 915 | 6/1998 |
| WO | WO 94/00932 | 6/1994 |

* cited by examiner

Primary Examiner—Duc Ho
(74) Attorney, Agent, or Firm—Pillsbury Winthrop LLP

(57) ABSTRACT

The invention relates to a method for testing the condition of a cellular radio system. The cellular radio system comprises a testing device which is a fixed part of the cellular radio system and operationally connected to a data network. The testing device has a connection over radio path to one or more base stations, and the operational condition of the cellular radio system is examined by means of the testing device by utilizing the radio connection of the testing device to at least one base station. In addition, the data network is utilized.

36 Claims, 6 Drawing Sheets

METHOD FOR MEASURING OPERATION OF CELLULAR RADIO SYSTEM, AND CELLULAR RADIO SYSTEM

This application is a Continuation of International Application PCT/FI00/00498 filed on 5 Jun. 2000, which designated the U.S. and was published under PCT Article 21(2) in English.

FIELD OF THE INVENTION

The invention relates to a cellular radio system and especially to one suited for indoor environments. The inventive solution measures the operational condition of the cellular radio system.

BACKGROUND OF THE INVENTION

A cellular radio network may comprise cells of various sizes. In sparsely populated areas, the cells are often large macro cells, whereas in population centres, it is possible to use small cells, i.e. micro or pico cells. The diameter of a pico cell is typically at most a few dozen metres, and the transmission power level used in it is at most a few hundred milliwatts, the diameter of a micro cell is at most a few hundred metres, and the transmission power level at most a few watts, and the diameter of a macro cell is at most a few dozen kilometers, and the transmission power level at most a few dozen watts. Macro cells are typically used to cover large areas, a micro cell covers a multi-storey office building and its vicinity, for instance. One or more pico cells are generally used in a cellular radio system intended for indoor environments, and a pico cell covers a few office rooms, for instance. The size hierarchy of cells can also have several levels, and the definitions of the names may vary. Cells of various sizes can be placed on top of each other, if necessary.

A prior art cellular radio system intended for indoor environments utilises known radio system technology and a data network. The radio system can be a CDMA or a GSM radio system whose terminals and base stations are integrated together by means of computer technology using a data network for data transmission. The data network, i.e. telecommunications network, can be an IP (Internet protocol) network, for instance, which connects base station controllers and a system controller. The operation of a base station controller can be distributed to an IMC (intranet mobile cluster) and an MS-IP controller, the IMC being able to manage a few base stations and the MS-IP controller being able to manage dozens of base stations. The MS-IP controller takes care of the signalling between the base station controller and the IP network. The base stations, base station controllers and the system controller are connected to each other through the data network whose data transmission rate depends on the load. The base stations are connected over radio path to terminals in their coverage area, and also generally transmit general signals, such as a BCCH (broadcast control channel) signal of a BCCH in an indoor radio system based on the GSM radio system.

Data transmission rate variations caused by data network load in particular can considerably decrease the quality of a signal or cut off the connection completely. A partial or complete failure of base station transmitters can also easily remain undetected in prior art solutions and cause great problems to users in that the signal disappears or its quality decreases.

BRIEF DESCRIPTION OF THE INVENTION

The object of the invention is thus to implement a method and a cellular radio system implementing the method so as to solve the above problems. This is achieved by the method described in the introduction for testing the operation of a cellular radio system comprising at least one terminal and a network element which comprises a data network having a system controller, at least one base station controller and at least one base station operationally connected to it; the base station controller controls at least one base station; and the data network is used for the data transmission required in the network element of the radio system. In the inventive method, the cellular radio system further comprises a testing device which is a fixed part of the cellular radio system; the testing device is operationally connected to the data network; the testing device has a radio connection to one or more base stations, and the operational condition of the cellular radio system is examined by means of the testing device by utilising the data network and the radio connection of the testing device to at least one base station.

The invention also relates to a cellular radio system comprising at least one terminal and a network element which comprises a data network having a system controller, at least one base station controller and at least one base station operationally connected to it; the base station controller is arranged to control at least one base station; and the data network is arranged to transmit the data required by the network element of the radio system. Further, the cellular radio system of the invention comprises a testing device which is a fixed part of the cellular radio system; the testing device is operationally connected to the data network; the testing device is arranged to have a radio connection to one or more base stations, and the radio system is arranged to examine the operational condition of the cellular radio system by means of the testing device by utilising the data network and the radio connection of the testing device to at least one base station.

Preferred embodiments of the invention are set forth in the dependent claims.

The method and system of the invention provide several advantages. The failure and overload of a cellular radio system can be quickly detected. This improves the quality of the service and signal available to the user.

BRIEF DESCRIPTION OF THE FIGURES

In the following, the invention will be described in greater detail by means of preferred embodiments and with reference to the attached drawings in which.

DETAILED DESCRIPTION OF THE INVENTION

The solution of the invention can be applied to cellular radio systems intended for indoor environments in particular, without being restricted to them, however.

Figure 1:
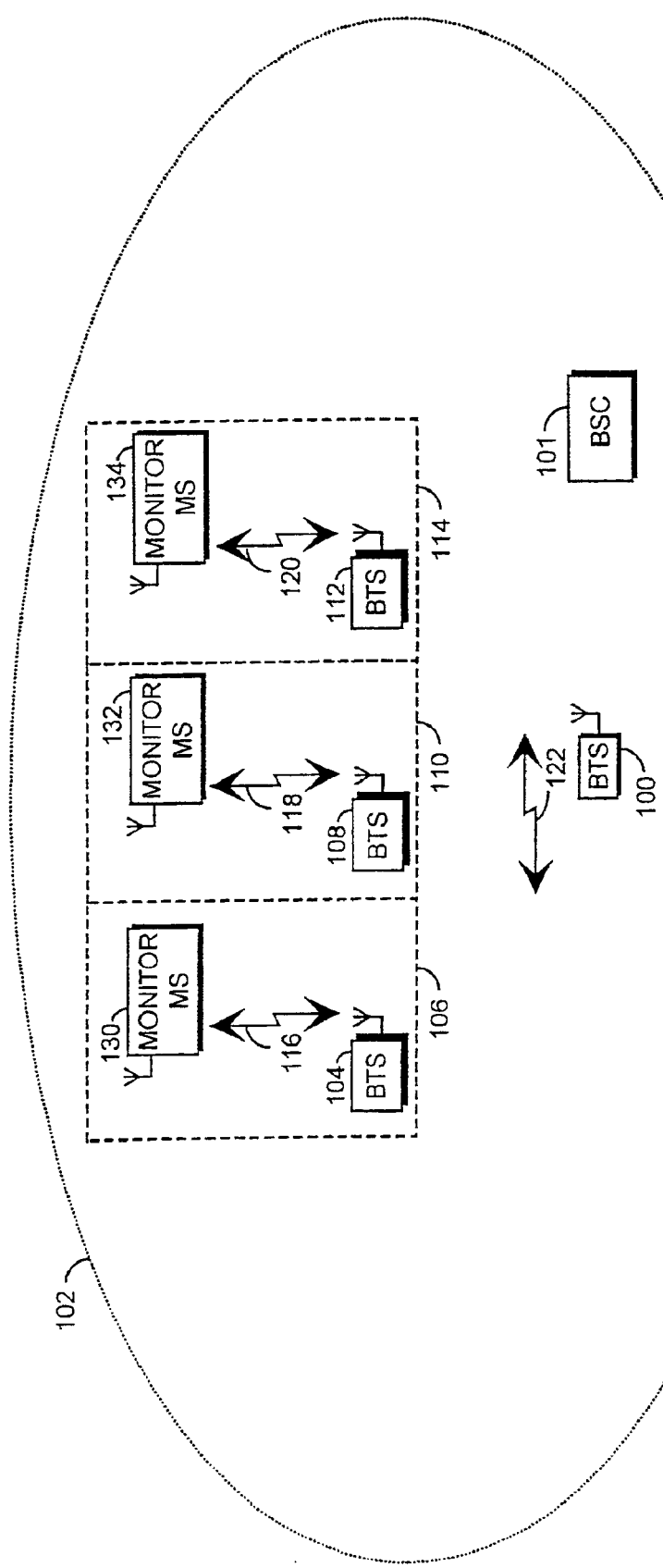
FIG. 1 shows a cellular radio network of the invention.

FIG. 1 shows two cellular radio networks. A cellular radio network comprises terminals and a network element which usually comprises all other parts of the radio system except the terminals. A macro cell radio network comprises a base station 100 and a macro cell 102 formed by it. A pico cell radio network comprising three base stations 104, 108, 112 and indoor pico cells 106, 110, 114 formed by them is located inside the macro cell 102. The data transmission connections of the macro base station 100 are shown by an arrow 122 in the figure. The data transmission connections of the pico base stations 104,108,112 are shown by arrows 116,118,120 in the figure. According to the invention, each pico cell 106,110,114 has a testing device 130, 132, 134.

Ways to implement a data transmission connection are described in FIGS. 2A to 2D in which one or more testing devices 200, 202 are operationally connected to a data network 204. The testing device 200, 202 is preferably like a terminal and can establish a normal data transmission connection to the base station in whose coverage area the testing device 200. 202 is. The testing device 200, 202 is preferably located indoors, for instance in the home, office, or business premises of a cellular radio network user, depending on the purpose of use. It is also possible to locate the device outdoors as long as a sufficient weather protection is provided. The testing device 200 should be in a location where electrical power from the mains can easily be arranged for the device, but a battery or a solar cell, for instance, can in special cases be used as the power source. The testing device 200, 202 is a fixed part of the radio system, i.e. the testing device 200, 202 is, for instance, fixed to an indoor wall or ceiling. The location of the testing device 200, 202 can be changed by detaching it and fixing it to another location. The fixing can be done by screws, for instance.

Figure 2A:
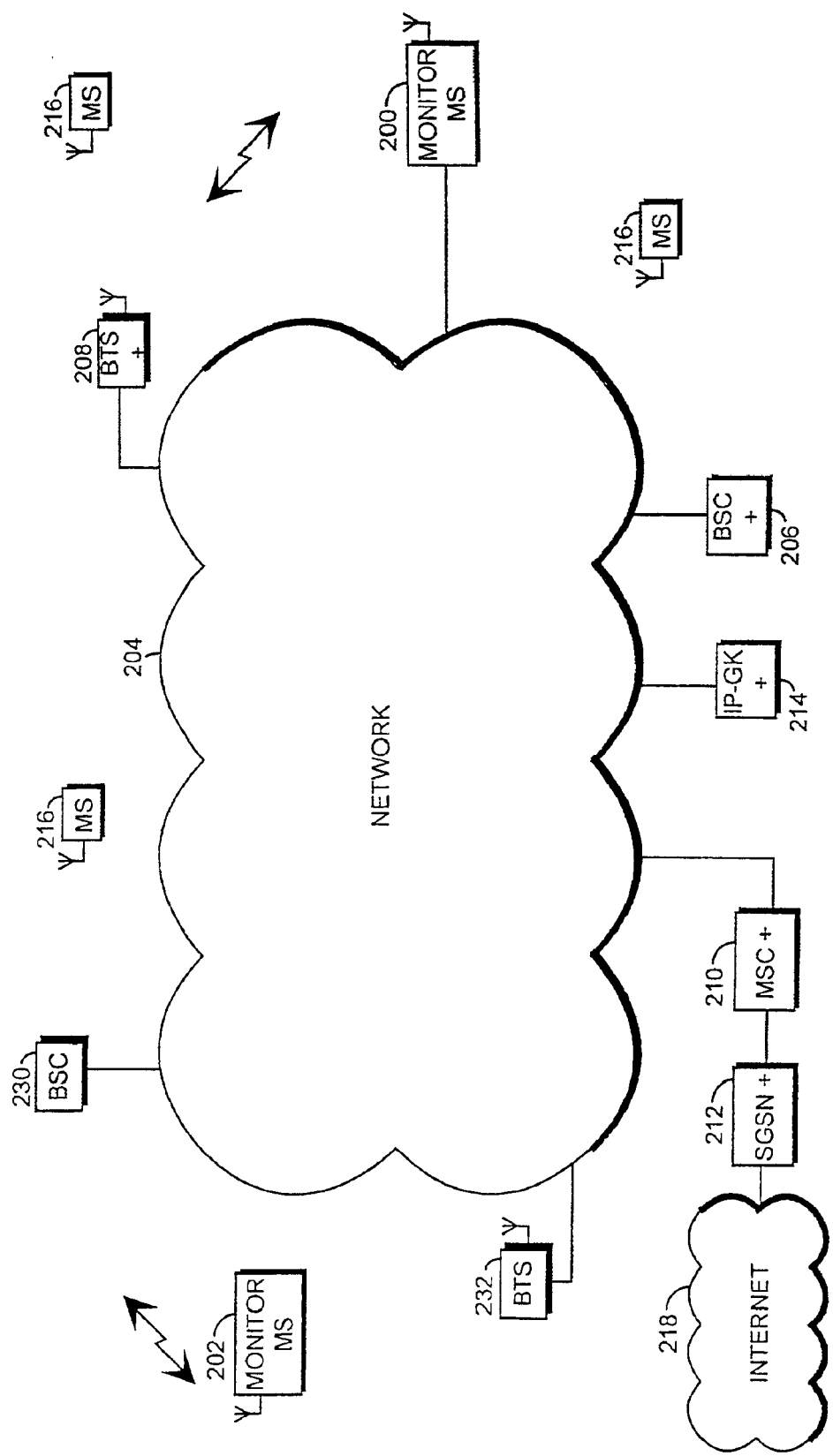
FIG. 2A shows the testing of a cellular radio system.

As shown in FIG. 2A, the solution of the invention has one or more testing devices 200, 202 fixed to the cellular radio system and the testing devices 200, 202 are operationally connected to a data network 204. One or more base station controllers 206, 230 controlling the operation of base stations 208, 232 in a manner known per se, are also connected to the data network 204. A system controller 210 is also connected to other parts of the radio system through the data network 204. The system controller 210 which controls the radio system parts in its area in a manner known per se, can also be connected to a SGSN controller (serving general packet radio service support node) through which the radio system can communicate in packet mode with the Internet 218, for instance. In addition, the data network 204 is usually connected to other cellular radio network parts, such as to an MS-IP controller 214 which maintains register data related to users and terminals. This register data includes the location of the terminal, the telephone number, address and port number, status, etc. The register data may also reside in or be used by other parts of the radio system, such as the system controller, and the data or its location bears no essential significance to the invention. Terminals 216 are in radio connection with one or more base stations. The radio connection between the terminals 216 and the base stations can be based on the GSM or the CDMA technology. The cellular radio system can be a GSM radio system or a CDMA radio system only, or both technologies can be used in the cellular radio system in such a manner that some of the terminals use at the same time the GSM technology and some the CDMA technology. Each terminal or at least some of the terminals can preferably change from a GSM-based TDMA connection to a CDMA-based connection.

Because data transmission between the various network element parts of the cellular radio system is done through the data network 204, the data transmission rate of the transmission path varies according to the load of the data network 204. Up till now, when building and using a cellular radio system, it has not been possible to measure the data transmission rate of the transmission path, but the cellular radio network has been assumed to work well enough. The ensuing poor runtime operation of the cellular radio system caused by too low a data transmission rate is noticed by the users in that the quality of speech reception is poor or completely garbled.

Let us now examine the possibilities for testing a cellular radio network in general. In the solution of the invention, the operation of the data transmission connection of a cellular radio network can be tested by means of the testing device 200, 202 by transmitting a test signal over radio path and data network from one known part of the radio system to another known part of the cellular radio system. The propagation time of the signal is measured in testing the data network. In testing the radio path, the distortion of the signal and/or the maintenance of the power level are also measured. The test signal should preferably be transmitted in various load situations of the data network 204 and especially during high loads, whereby information on the impact of the load on the propagation of the signal can be obtained. The solution of the invention provides the possibility to alter the load of the data network 204 in particular, whereby it is possible to simulate different load situations. When the load is altered, the system controller directs the parts connected to the data network to transmit the data to a desired extent in the data network. Because the testing device 200 resembles a mobile phone, a test call can be set up and made to at least one desired base station. By transmitting the test signal from the base station through the data network 204 to other parts of the radio system, the data transmission rate of the data network 204 can be measured by a time-stamped test signal when the route of the test signal in the radio system is known. The measurement can preferably be made during the use or building of the radio system.

Let us now by means of FIG. 2A examine in more detail the testing of a cellular radio system. The testing of a radio system is performed in such a manner, for instance, that the testing device 200 begins controlled by the system controller 210 and/or the base station controller 206 to set up a test call to the base station 208. The priority of the test call is preferably raised to a higher level and other load of the MS-IP controller 213 is set to a desired level (for instance low). When the call has been set up, the testing device 200 begins to transmit an exactly timed signal, for instance a sini signal, to the base station 208 over radio path and the base station 208 transmits the test signal to the data network 204 using a suitable protocol (TCP-IP protocol). The transmitted test signal is this way returned through the data network 204 back to the base station controller 206. The base station controller 206 compares the transmitted signal with the original signal and measures the propagation time of the signal. Because the test signal can also be transmitted from the system controller 210, it can also be returned through the data network 204 back to the system controller 210 which then performs the required measurements. The test signal can also be routed from the base station 208 through the MS-IP controller 214 (or the SGSN controller) back to the base station controller 206 or the system controller 210. Thus, the inventive idea is that a loop or other known route is formed of the propagation path of the test signal transmitted by the testing device 200 to cover the radio path and the data network 204.

In a TDMA-based radio system, the testing method can also be such that a test call is set up between the testing device 200 and the base station 208, and the base station 208 controlled by the system controller 210 and/or the base station controller 206 transmits a test signal, which is an exactly timed burst (for instance a sini burst), in TCP-IP format to a certain exactly specified transmission time-slot. This test signal of a certain time-slot is routed from the system controller 210 and/or the base station controller back to the base station 208, and the propagation time of the signal can then be measured. On the basis of the propagation time of the signal, the data transmission resources of the cellular radio system can be increased or rearranged so as to improve the operation of the cellular radio system.

When using time division-based data transmission between the testing device and the base station, one or more time-slots can be reserved for data transmission for a test call made over radio path. The test data can, for instance, be first transmitted using one time-slot. After this, two time-slots can be used, etc. The testing can this way be continued until all available time-slots have been tested. In the solution of the invention, test data is transmitted between the base station and the testing device in a desired manner in one or more time-slots, and the test data is transmitted for checking through the data network to some part of the radio system, for instance the system controller.

Further, either packet or circuit switched data transmission can be used in data transmission between the testing device and the base station over radio path. Packet switched data transmission is a method in which a connection is established between users by transmitting data in packets which contain not only the actual information, but also address and control data. The same transmission channel can be used by several connections at the same time. The packet switched method is well suited for data transmission where the transmitted data is generated in bursts. Then, the data transmission connection need not be continuously reserved, but only for the time of the packet transmissions. This provides significant cost and capacity savings both during building and using the network. To make the data transmission fast enough, applications employing packet switching require high reliability from the transmission to avoid re-transmissions, for instance. In circuit switched data transmission, a channel is reserved for a transmitter and receiver regardless of whether data is transmitted or not. Address and control data is then not necessarily needed. In the solution of the invention, test data is transmitted packet switched or circuit switched between the base station and the testing device, and the test data is transmitted for checking through the data network to some part of the radio system, for instance the system controller. This way, the operation of both transmission methods in the radio system can be tested. It is thus possible to test all network element parts marked with the + sign in FIG. 2A by means of the testing device 200, 202.

In the solution of the invention, the testing device 202 is not connected by a cable to the data network 204, but it has a radio connection to the base station 230 which has a connection to the data network 204. The quality of the connection (cable/radio) does not affect the measures taken in the solution of the invention. The testing device 202 can test the operation of the radio network by transmitting a test signal or an enquiry to the base station 230. The test signal can be transmitted as a short message, for instance, to which the base station 230 or another device to which the enquiry is sent replies. The enquiry is directed to the channels of the base station 230, for instance, which the testing device 202 asks the base station to test. The reply is transmitted to the testing device 202 over radio path or to another radio system device collecting the testing results through the data network 204.

Figure 2B:
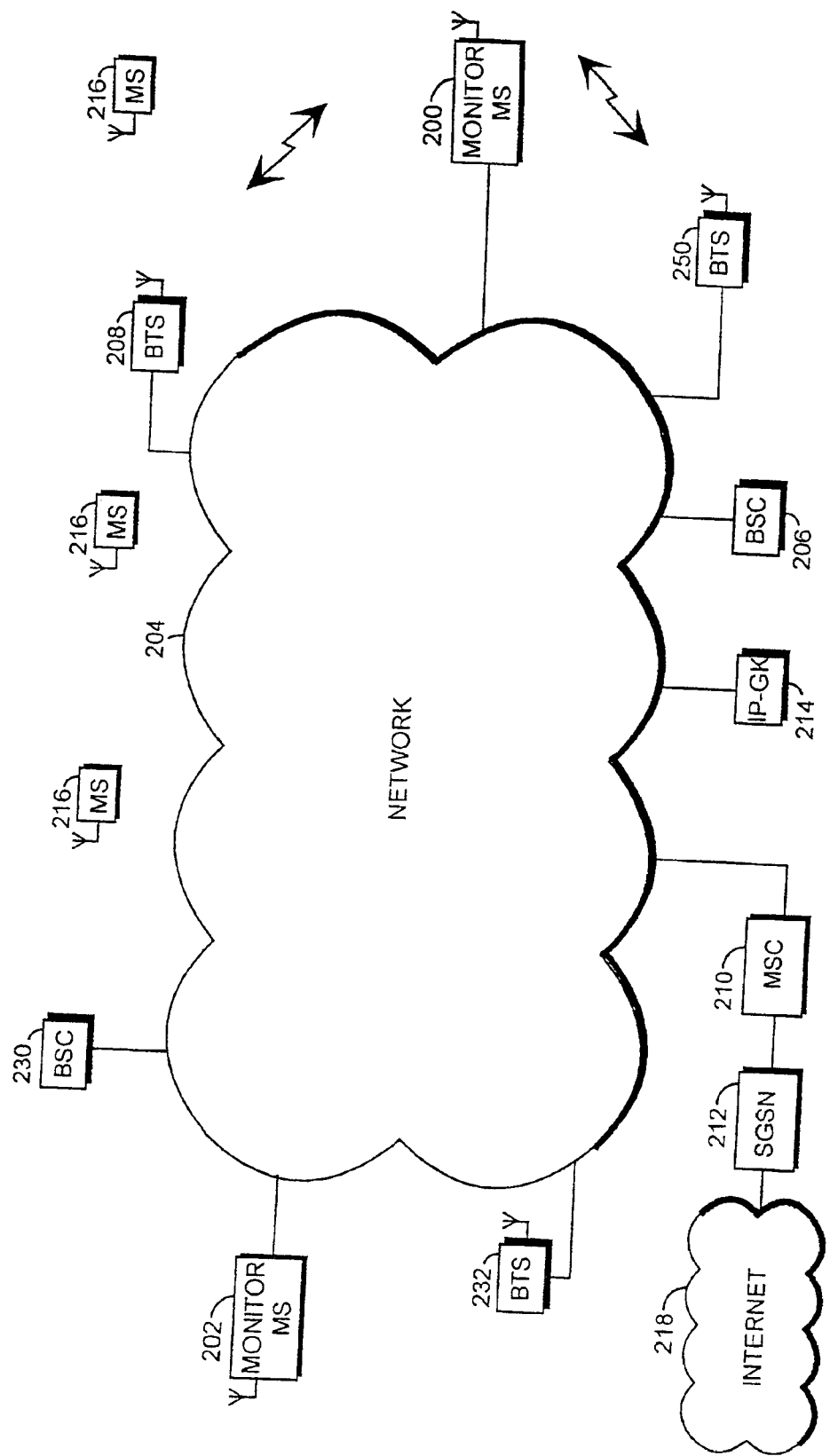
FIG. 2B shows the testing of a cellular radio system.

Let us now by means of FIG. 2B examine a solution of the invention in which the operation of handover is tested. Handover presents a problem especially in the GSM radio system and in the IP network, and it is possible to test handover with the solution of the invention as well as correct any problems, whereby problems during the actual operation of the cellular radio system can be avoided. The testing device 200 is directed to perform handover to a base station under the same and/or another base station controller. This is done by the system controller 210 in the same manner as in prior art radio systems. The testing device 200 is then directed to establish a connection to the base station 208 over radio path, and the testing device 200 is directed to perform a forced handover from the base station 208 to the base station 250. Should the handover fail, the testing device 200 sends out an error message.

Figure 2C:
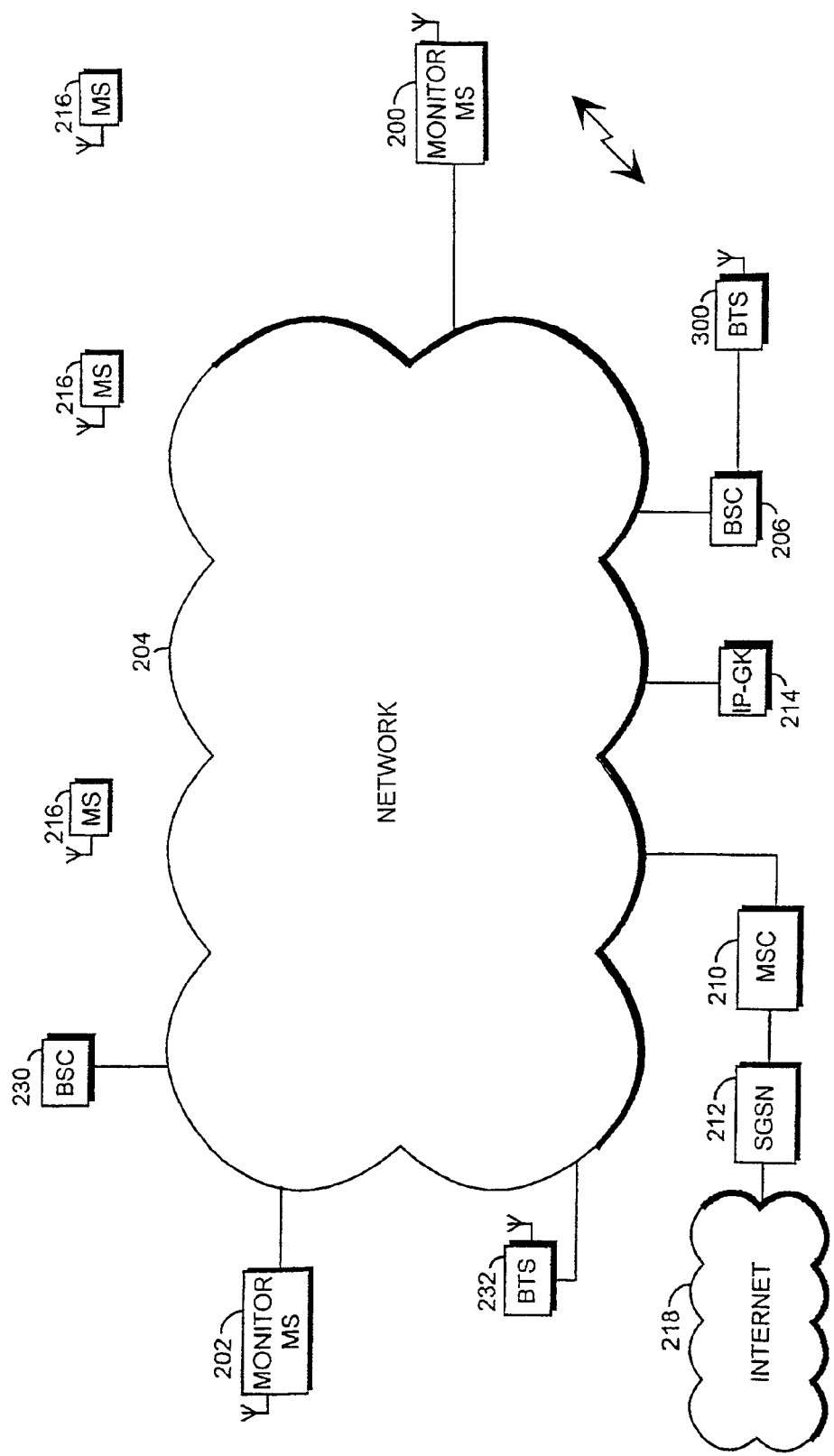
FIG. 2C shows the testing of a cellular radio system.
Figure 2D:
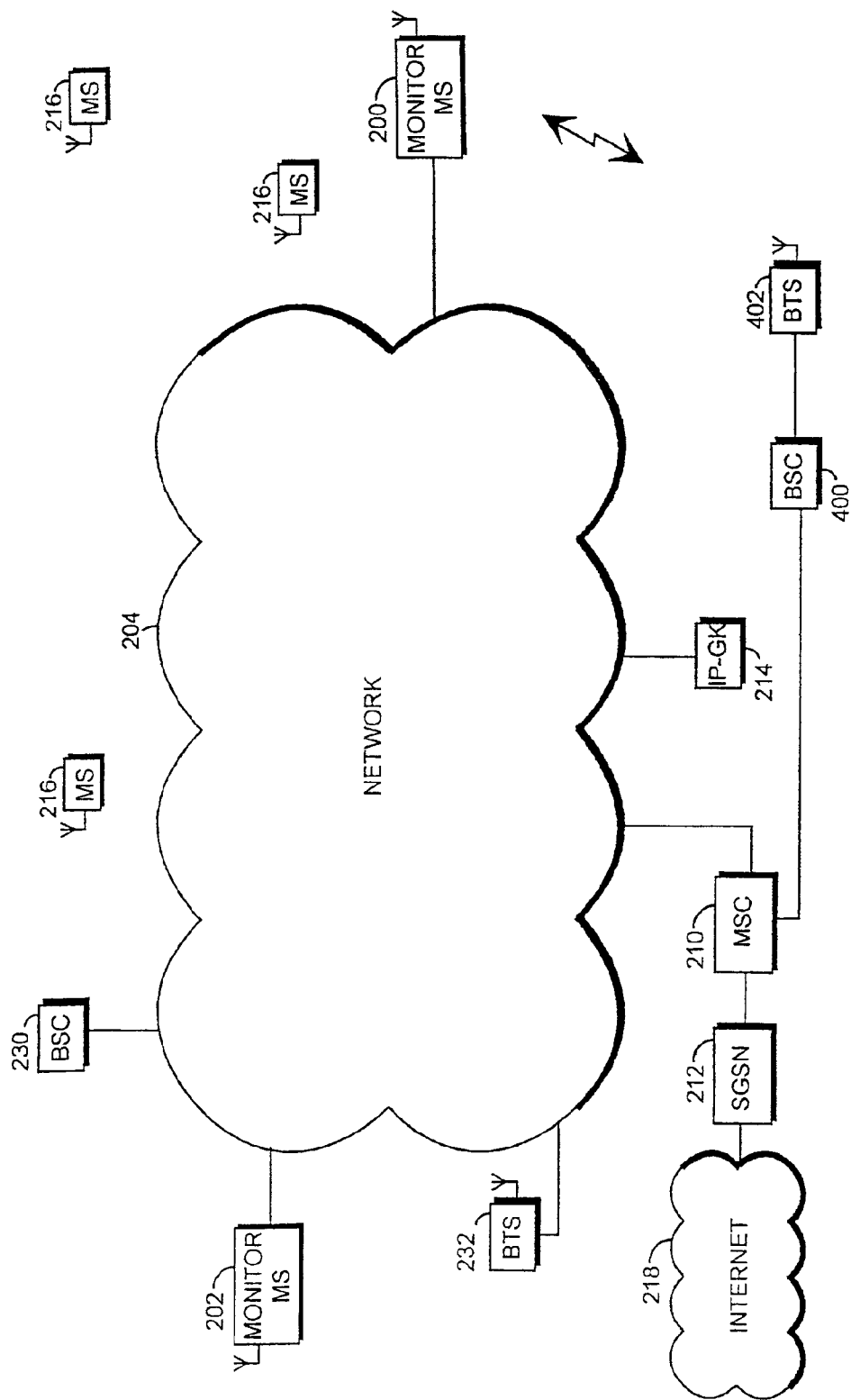
FIG. 2D shows the testing of a cellular radio system.

FIGS. 2A and 2B show situations in which a base station in radio connection with the testing device 200 forms a pico cell. FIGS. 2C and 2D show a situation in which the base station being tested forms a macro cell. In the situation in FIG. 2C, the base station 300 which is under the base station controller 206 of a pico cell forms a macro cell. This situation is otherwise similar to the situation in FIG. 2A, but the testing device 200 is now in contact with the base station 300 of a macro cell, which does not essentially change the testing process. In FIG. 2D, a base station 402 is under a base station controller 400 of a macro cell. The signalling of the network element then always goes through the system controller 210 comprising pico cells and through the base station 400 controlling macro cells to the base station 402. Otherwise, the connection between the base station 402 and the testing device 200 works in a similar way as in the case of FIG. 2A. While testing the signal propagation in the case of FIG. 2D, it is also possible to examine the operation of the macro cell base station controller 400.

In the solution of the invention, the different phases of operation of the base station 208, 250, 300, 400 are monitored through the data network 204 during the testing. The monitoring comprises monitoring the transmission and reception by means of message sequences of the base station 208 and the testing device 200, which sequences indicate what messages the base station and the terminal (testing device) transmit to each other during a call, handover or other important mutual action, or when preparing for one. The operation of various registers are also checked during testing. During testing, it is, for instance, possible to test how the home location register changes when the home location parameter of the testing device is changed. Similarly, the impact of a change in the identification of the testing device on the registers and on other operation can be tested. The identification parameter of the testing device can be set to another identification than that of a terminal in the area of the home cell. When the testing device then establishes a connection through a base station with the network element of the cellular radio system, it is possible to test whether the cellular radio system accepts a call set-up of the testing device. At the same time, the operation of the various registers in the cellular radio system can be examined. The operation of the base station and the registers is monitored by the system controller, for instance, through the data network.

In the solution of the invention, the testing device 200, 202 can also monitor the operation of the base stations by listening to the known transmissions transmitted by the base stations over radio path. A known transmission can be a BCCH signal, for instance, transmitted on a general channel. Regardless of the location of the testing device 200, 202 in the radio system, the testing device receives a known signal from the base stations it can listen to and measures the quality of the received known signal. The measurement can also be made elsewhere in the radio system. If a known signal transmitted by a base station has changed, distorted or lost some of its power, it usually means that there is something wrong with the base station. In such a case, the transmitter of the base station is often broken, which cannot be noticed otherwise than by receiving and monitoring the transmission of the base station. If the known signal of the base station is fine, no measures are taken in the solution of the invention. If, however, an error is detected in the known signal of the monitored base station, the testing device sends an error message through the data network to the controller controlling the system, and from there on, the error message is also forwarded to persons monitoring the system.

The reception of the base station can be tested in such a manner that when the testing device 200 is over radio path in contact with the base station 208, the transmission power of the testing device 200 is gradually reduced and the quality of the signal received by the base station is monitored. This way, it is possible to examine the sensitivity and condition of the receiver of the base station 208. The base station can itself, for instance, measure the quality of the signal it receives. The test signal is then transmitted for comparison through the data network also to the base station. The signal quality can also be measured by the system controller 210 or the base station controller 206 from which the testing signal transmitted by the testing device 200 preferably originates. The essential thing here is that the signal received over radio path and the original signal are compared at the same location. The transmission of the original signal and/or the signal received by the base station in the data network 204 does not impede the measuring in this case. The testing device can be connected to several base stations at the same time and thus several base stations can be tested simultaneously.

Figure 3:
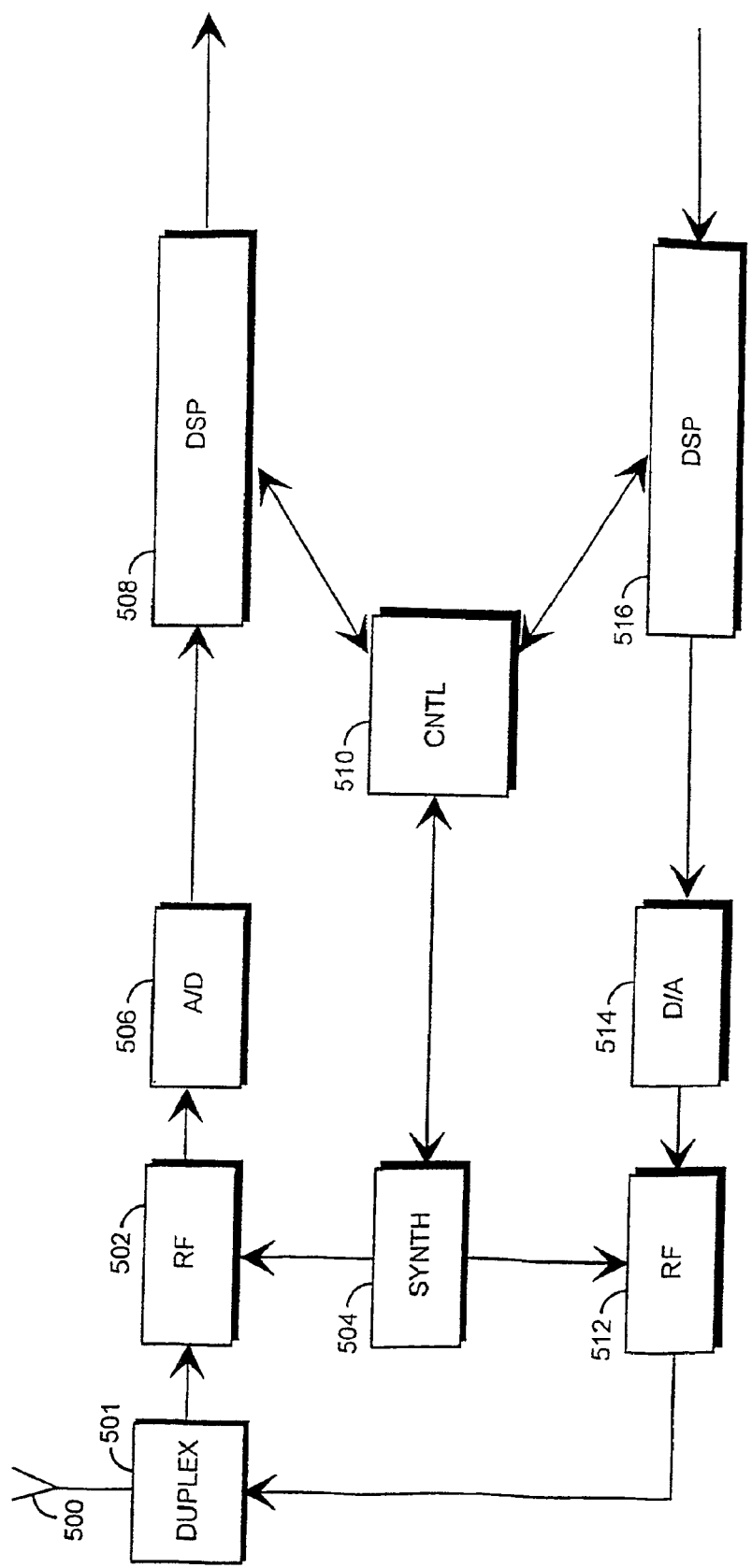
FIG. 3 shows a block diagram of a testing device.

FIG. 3 shows a block diagram of the testing device. The testing device 200 comprises an antenna 500 which receives a signal. The received signal propagates to RF means 502 in which the received RF signal is converted to baseband by multiplying it by the frequency of a local oscillator 504. The baseband signal is converted to digital in an A/D converter 506, after which the received signal propagates to a digital signal processing part 508 and on to other parts of the radio system. When transmitted, the signal is processed in a digital signal processing part 516. The digital signal is converted to analogue in a D/A converter 514 and the analogue signal is multiplied by an RF carrier in RF means 512 which obtains the carrier from the local oscillator 504. The RF signal is transmitted through the antenna 500. A control block 510 controls the operation of the testing device as well as the frequency of the local oscillator and the digital signal processing in particular. Reception and transmission are separated from each other in a known manner with a filter 501 which is preferably a duplex filter.

The data network can be an IP (Internet protocol) network or an ATM (asynchronous transfer mode) network, for instance. When using an IP network, for instance, each network element has its own IP address to which the data packets are addressed. The data network can also be a wider intranet which joins the geographically separated company sites to each other. The data network can be implemented by its own cabling or data can be transmitted in conductors intended for some other use, such as in the general electrical network.

All errors and problems detected during testing are sent in an error message to the system controller, for instance, from which it is forwarded to persons managing the cellular radio system. This ensures that the problems are solved and errors corrected. Sections of the network element of the invention are preferably implemented by software run in a processor. Sections of the network element of the invention can also be implemented by hardware, for instance by VLSI (very large scale integrated circuit) components or by ASIC (application specific integrated circuit) technology.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for testing the operation of a cellular radio system comprising at least one terminal and a network element which comprises a data network having a system controller, at least one base station controller and at least one base station operationally connected to it; the testing device, which is a fixed part of the cellular radio system, operationally connected to the data network, and over radio path connected to one or more base stations; the method comprising:

controlling at least one base station by the base station controller;

using the data network for the data transmission required by the network element of the radio system;

examining by means of the testing device, which testing device is a fixed part of the cellular radio system, which testing device is operationally connected to the data network, and which testing device is over radio path connected to one or more base stations, the operational condition of the cellular radio system by utilising the data network and the radio connection of the testing device to at least one base station.

2. A method as claimed in claim 1, directing the testing device to establish a two-way radio connection to at least one base station in order to test the operation of the radio system.

3. A method as claimed in claim 1, measuring the data transmission rate of a known transmission path with a time-stamped test signal, the transmission path comprises the radio path between the testing device and the base station, and a data network, and the route of the test signal on the transmission path of the cellular radio system is known.

4. A method as claimed in claim 1, directing the testing device to establish a connection over radio path with at least one base station, and the connection is based on time division and it is directed to use one time-slot to test the operation based on the time division of the cellular radio system.

5. A method as claimed in claim 1, directing the testing device to establish a connection over radio path with at least one base station, and the connection is based on time division and it is directed to use several time-slots to test the operation based on the time division of the cellular radio system.

6. A method as claimed in claim 1, transmitting data in packet switched mode in the connection established between the testing device and the base station in order to test the packet switched transmission.

7. A method as claimed in claim 1, transmitting data in circuit switched mode in the connection established between the testing device and the base station in order to test the circuit switched transmission.

8. A method as claimed in claim 1, directing the testing device to establish a connection over radio path with at least one base station and directing the testing device to perform a forced handover to another base station or to other base stations to test the handover functions of the radio system.

9. A method as claimed in claim 1, directing the testing device to test the operation of at least one register of the radio system by altering the parameters of the testing device which affect the tested registers.

10. A method as claimed in claim 1, controlling and testing in various load conditions the data transmission load of the data network.

11. A method as claimed in claim 1, directing the testing device to establish a connection over radio path with at least one base station, and reducing the transmission power of the testing device and monitoring the sensitivity and operational condition of the receiver of the base station.

12. A method as claimed in claim 1, monitoring the operation of the base station by means of message signals through the data network during testing.

13. A method as claimed in claim 1, transmitting by the base stations of the cellular radio system a known signal over radio path,
receiving by the testing device a known signal transmitted by at least one base station,
if an erroneous known signal is received from the monitored base station, sending an error message through the data network.

14. A method as claimed in claim 13, wherein the known signal is a BCCH signal.

15. A method as claimed in claim 1, wherein if the testing fails, sending an error message.

16. A method as claimed in claim 1, wherein the radio system comprises pico cells and, the base station is a base station of a pico cell.

17. A method as claimed in claim 1, wherein the radio system comprises both pico cells and macro cells, and the base station is a base station of a macro cell.

18. A method as claimed in claim 1, wherein the data network is an IP network.

19. A cellular radio system comprising:
at least one terminal and a network element which comprises a data network having a system controller, the data network being arranged to transmit the data required by the network element of the radio system;
at least one base station;
at least one base station controller, the at least one base station being operationally connected to the base station controller, and the base station controller being arranged to control the at least one base station;
a testing device which is a fixed part of the cellular radio system, the testing device being operationally connected to the data network, and the testing device being arranged to be in contact over radio path to one or more base stations; and
the radio system is arranged to examine the operational condition of the cellular radio system by means of the testing device by utilising the data network and the radio connection of the testing device to at least one base station.

20. A cellular radio system as claimed in claim 19, wherein to test the operation of the radio system, it is arranged to direct the testing device to establish a two-way radio connection with at least one base station.

21. A cellular radio system as claimed in claim 19, wherein the radio system is arranged to measure the data transmission rate of the transmission path with a time-stamped test signal,
the transmission path comprises the radio path between the testing device and the base station and a data network, and
the route of the test signal on the transmission path of the cellular radio system is known.

22. A cellular radio system as claimed in claim 19, wherein the radio system is arranged to direct the testing device to establish a connection over radio path with at least one base station, the connection being based on time division and the connection being arranged to use one time-slot to test the operation based on time division.

23. A cellular radio system as claimed in claim 19, wherein the radio system is arranged to direct the testing device to establish a connection over radio path with at least one base station, the connection being based on time division and the connection being arranged to use several time-slots to test the operation based on time division.

24. A cellular radio system as claimed in claim 19, wherein the connection established between the testing device and the base station is arranged to transmit data in packet switched mode to test the packet switched transmission.

25. A cellular radio system as claimed in claim 19, wherein the connection established between the testing device and the base station is arranged to transmit data in circuit switched mode to test the circuit switched transmission.

26. A cellular radio system as claimed in claim 19, wherein the radio system is arranged to direct the testing device to establish a connection over radio path with at least one base station and the radio system is arranged to direct the testing device to perform a forced handover to another base station or to other base stations to test the handover functions of the radio system.

27. A cellular radio system as claimed in claim 19, wherein the radio system is arranged to test the operation of at least one register in the radio system by altering the parameters of the testing device which affect the registers.

28. A cellular radio system as claimed in claim 19, wherein the radio system is arranged to control the data transmission load of the data network and to perform tests in various load conditions of the data network.

29. A cellular radio system as claimed in claim 19, wherein the radio system is arranged to direct the testing device to establish a connection over radio path with at least one base station and the radio system is arranged to reduce the transmission power of the testing device and to monitor the sensitivity and operational condition of the receiver of the base station.

30. A cellular radio system as claimed in claim 19, wherein the radio system is arranged to monitor the operation of the base station by means of message signals through the data network during testing.

31. A cellular radio system as claimed in claim 19, wherein the base station of the cellular radio system are arranged to transmit a known signal over radio path,
the testing device is arranged to receive a known signal transmitted by at least one base station,
if an erroneous known signal is received from the monitored base station, the radio system is arranged to send an error message through the data network.

32. A cellular radio system as claimed in claim 31, wherein the known signal is a BCCH signal.

33. A cellular radio system as claimed in claim 19, wherein if the testing fails, the radio system is arranged to send an error message.

34. A cellular radio system as claimed in claim 19, wherein the radio system comprises pico cells, and the base station is a base station of a pico cell.

35. A cellular radio system as claimed in claim 19, wherein the radio system comprises both pico cells and macro cells, and the base station is a base station of a macro cell.

36. A cellular radio system as claimed in claim 19, wherein the data network is an IP network.

* * * * *